Jan. 31, 1961 O. R. HUGGINS 2,969,859
CROSS ARM SUPPORTING GAIN
Filed April 22, 1958 3 Sheets-Sheet 1
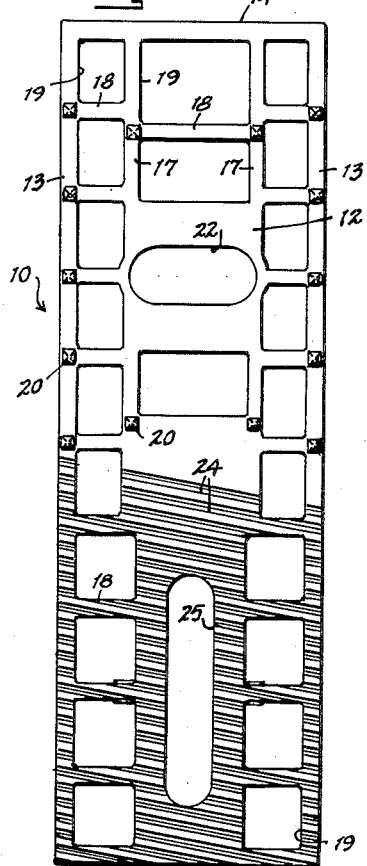
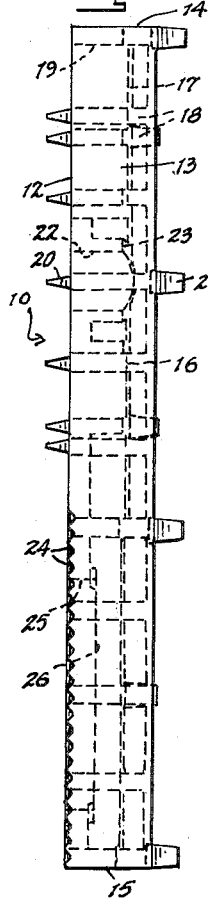
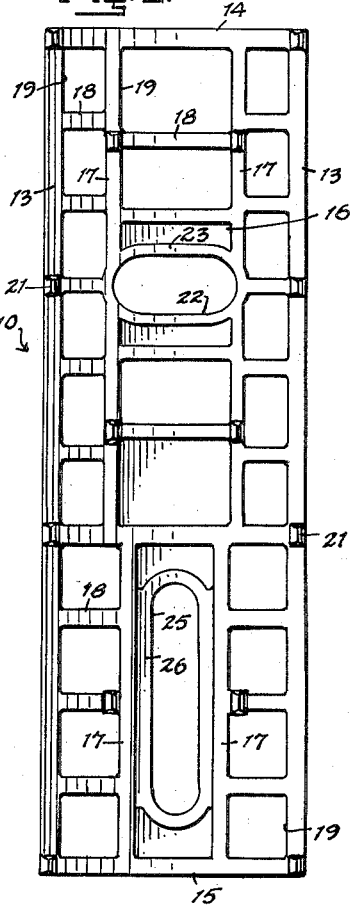
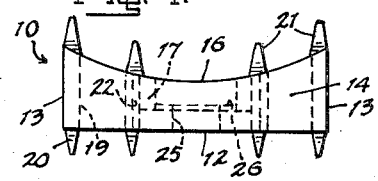
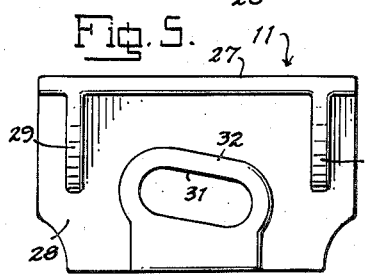
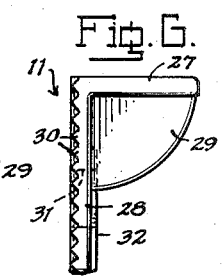
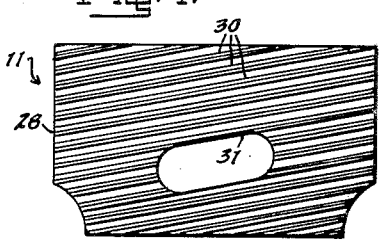
INVENTOR.
OWEN R. HUGGINS
BY
ATTORNEY.

Jan. 31, 1961  O. R. HUGGINS  2,969,859
CROSS ARM SUPPORTING GAIN
Filed April 22, 1958  3 Sheets-Sheet 2
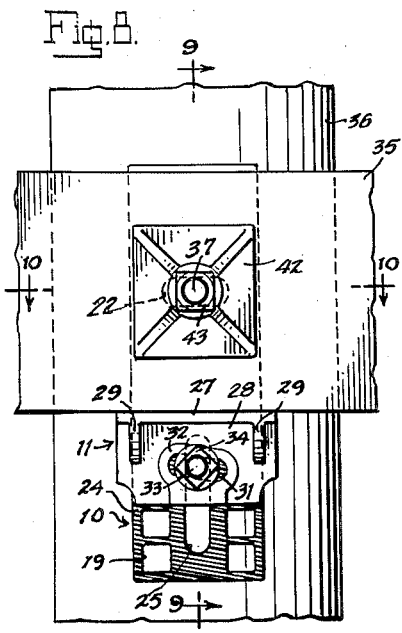
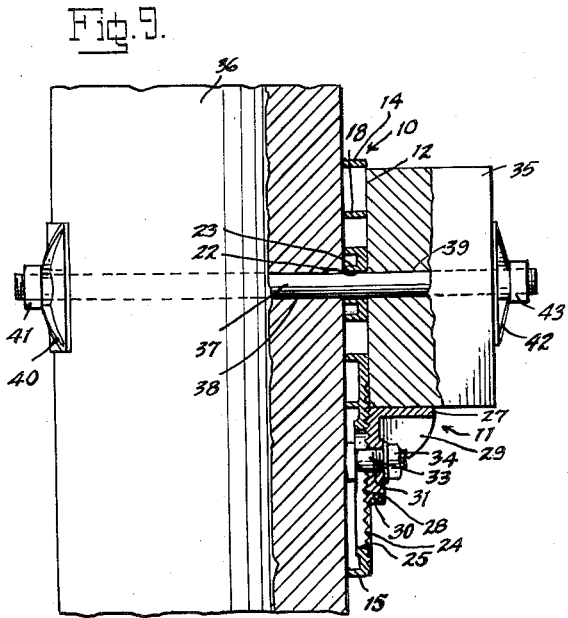
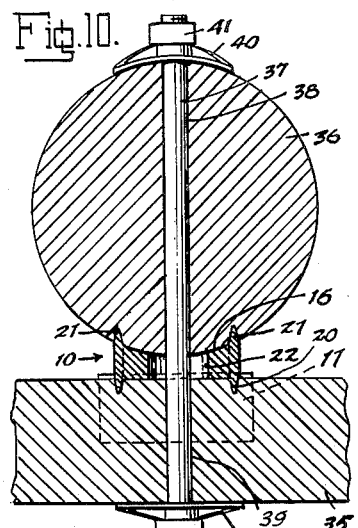
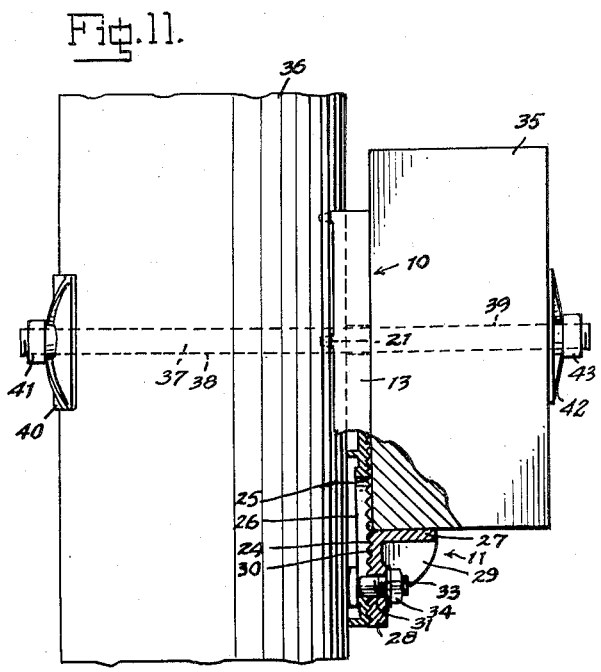
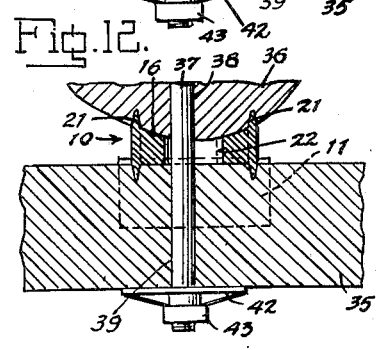
INVENTOR.
OWEN R. HUGGINS
BY
ATTORNEY.

Jan. 31, 1961 — O. R. HUGGINS — 2,969,859
CROSS ARM SUPPORTING GAIN
Filed April 22, 1958 — 3 Sheets-Sheet 3
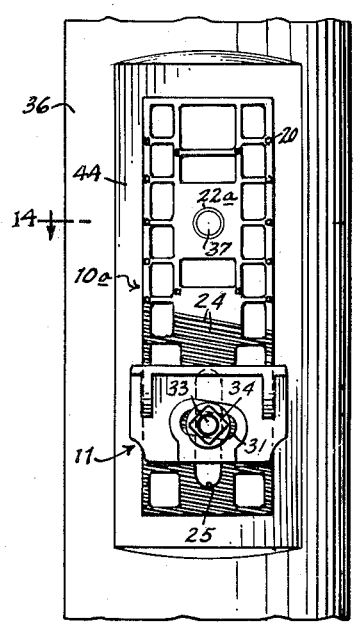
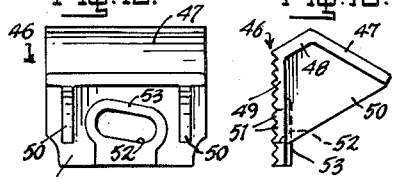
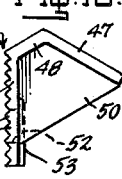
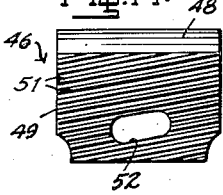
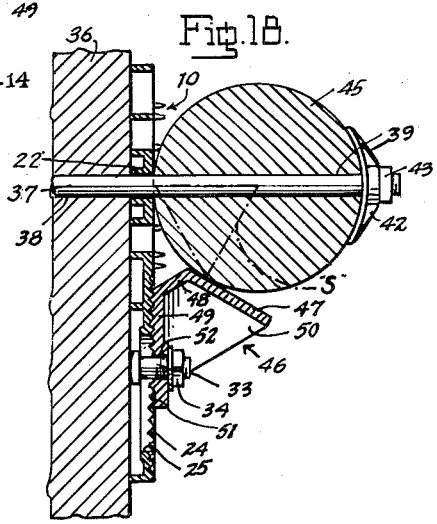
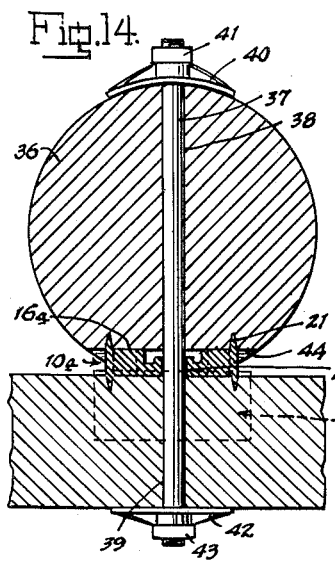
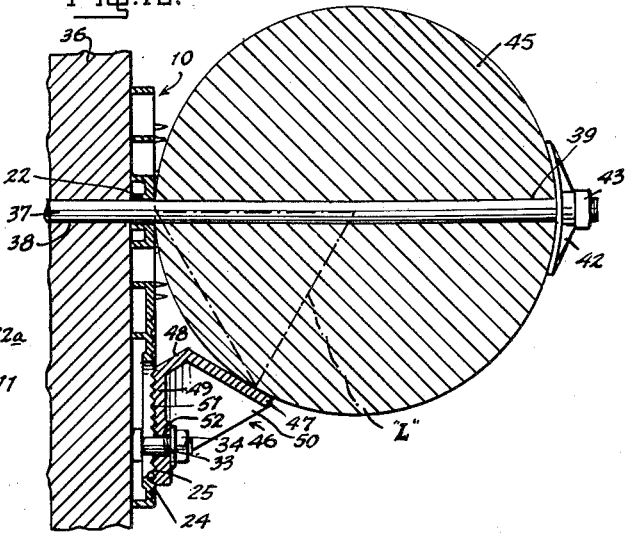
INVENTOR.
OWEN R. HUGGINS
BY
ATTORNEY.

United States Patent Office 2,969,859
Patented Jan. 31, 1961

2,969,859

CROSS ARM SUPPORTING GAIN

Owen R. Huggins, Darien, Conn., assignor to Malleable Iron Fittings Company, Branford, Conn., a corporation of Connecticut Filed Apr. 22, 1958, Ser. No. 730,086

5 Claims. (Cl. 189—33)

The present invention relates to a cross arm supporting gain, particularly for the support of cross arms upon transmission poles or the like. An object of the invention is to provide a gain of this character which may be adjusted to accommodate cross arms having a wide variation in their vertical dimension, and which are center drilled to receive the through-bolt extending transversely through the pole. In practice such cross arms may vary within fractions of an inch from their nominal dimensions, so that slight variations occur in the dimension between the through-bolt and the lower supported side of the cross arm.

It is a further object to provide a gain having an adjustable cross arm supporting shelf member adapted to be interlockingly positioned in a succession of major positions of vertical adjustment roughly approximating fitting relation with the cross arm, and which may then have micromatic adjustment from such approximate positions of adjustment to bring it into exact fitting relation, the latter adjustment being conveniently carried out by hammer blows directed laterally upon the side of the shelf member to cause it to be moved upwardly into engagement with the underside of the cross arm. To this end, it is proposed to provide a gain having a vertically disposed body member and a shelf member interlockingly engaged therewith, the interlocking means comprising interengaged diagonally extending serrations in the form of grooves and ribs upon the body and shelf members which permit vertical repositioning of the shelf member to obtain the major increments of adjustment and diagonal movement of the shelf member to obtain the micromatic adjustment.

A further object is to provide a gain which is adapted to be supported in a fixed position vertically with respect to the through-bolt, and to provide in at least one embodiment of the invention a gain which is adapted to have transverse adjustment so as to accommodate the gain to the natural shape of a round pole, and also to accommodate lack of alignment of the bolt hole in the pole and the desired position relatively thereto of the cross arm.

Other objects and advantages will become apparent from a consideration of the following detailed description taken in connection with the accompanying drawings wherein satisfactory embodiments of the invention are shown. However, it will be understood that the invention is not limited to the details disclosed but includes all such variations and modifications as fall within the spirit of the invention and the scope of the appended claims.

In the drawings:

Fig. 1 is a front elevation of the body member of a gain according to one embodiment of the invention;

Fig. 2 is a side elevation;

Fig. 3 is a rear elevation;

Fig. 4 is a top plan view;

Fig. 5 is a front elevation of a shelf member constituting a co-operative part of the gain of the invention;

Fig. 6 is a side elevation;

Fig. 7 is a rear elevation;

Fig. 8 is a front elevation showing the gain in its supporting relation with a rectangular cross-section cross arm upon a round wood pole, the cross arm having a substantially minimum vertical dimension;

Fig. 9 is a view partially in side elevation and partially in vertical section, taken along the line 9—9 of Fig. 8;

Fig. 10 is a horizontal sectional view, taken along line 10—10 of Fig. 8;

Fig. 11 is a side elevation, partially in vertical section, showing the gain adjusted to accommodate a cross arm having a substantially maximum vertical dimension.

Fig. 12 is a fragmentary horizontal sectional view similar to Fig. 10 and showing the gain transversely adjusted to accommodate it to the irregular surface of the round wood pole.

Fig. 13 is a front elevation showing a gain according to a modified embodiment of the invention mounted upon a flattened area of a round wood pole, the cross-arm being removed;

Fig. 14 is a horizontal sectional view, taken along the line 14—14 of Fig. 13, the cross-arm being shown in its supported relation to the gain;

Fig. 15 is a front elevation of a modified form of shelf member, adapted for supporting round cross-arm;

Fig. 16 is a side elevation;

Fig. 17 is a rear elevation;

Fig. 18 is a fragmentary vertical sectional view similar to Fig. 9, and showing a gain provided with the shelf member of Figs. 15–17 in supporting relation to a round cross-arm of substantially minimum diameter;

Fig. 19 is a vertical sectional view similar to Fig. 18, and showing the gain adjusted to accommodate a round cross-arm of substantially maximum diameter.

Referring particularly to Figs. 1–12 in the drawings, the cross-arm supporting gain, according to the exemplary embodiment of the invention illustrated therein, comprises a vertically disposed body member 10, Figs. 1–4, and a horizontally disposed shelf member 11, Figs. 5–7, adjustably connected to the body member, as seen in Figs. 6–12, for the support of a cross-arm of rectangular cross-section and any vertical cross-sectional dimension within a normal dimension range, such range being for example 7 inches minimum to 12 inches maximum.

The body member 10, preferably in the form of a malleable iron casting, is provided with a cross arm engaging generally flat forward face 12 of rectangular outline, side walls 13—13, upper and lower end walls 14 and 15, and a pole engaging rearward face 16 of gridlike structure and of substantially curved concave form to substantially conform to a round pole surface. The grid-like structure is formed by vertical ribs 17—17 in inwardly spaced parallel relation to side walls 13—13 and a series of vertically spaced transverse ribs 18 parallel to the end walls 14 and 15. The grid structure adjacent the side walls 13—13, as well as in the upper central position, is open to the forward face of the gain, thus providing rectangular openings 19, which in addition to lightening the weight of the gain provide air pockets between the pole and the cross-arm.

The upper portion of the forward face 12 is provided at suitably spaced points with pyramid shaped prongs 20 for imbedding in the rearward side of the cross-arm, and the rearward face 16 is provided at suitably spaced points with wedge shaped spurs 21 for imbedding in the round wood pole.

Substantially centrally of the upper portion of the body member there is provided a through-bolt receiving transversely extending slot opening 22, outlined at the rearward face by a wall 23, the rearward surface of which conforms to the concave rearward side of the gain. The lower portion of the forward face is provided with a series of serrations in the form of V-shaped parallel grooves 24 extending diagonally between the side edges of the gain, the angle of these grooves being of the order of about 10, so that in the case of the gain being 4 inches wide for example, the rise of the grooves between the two side edges of the gain is approximately ¾ inch. A vertical slot opening 25 is provided within the grooved area centrally of the lower portion of the gain for the purpose of receiving a clamping bolt for the shelf member 11, the clamping bolt, as will presently more fully appear, being vertically adjustable in the slot. At the rearward face, the slot opening 25 is outlined by a wall 26, its rearward surface being flat and providing bearing for the clamping bolt head, and the vertical ribs 17 at each side of the slot opening providing a channel in which the bolt head is held against turning, as will presently more fully appear.

The shelf member 11, preferably in the form of a malleable iron casting, comprises a horizontal shelf portion 27, a vertical back portion 28 extending downwardly from the rearward edge of the shelf portion, and bracing strut portions 29—29, extending between the shelf portion and the forward side of the back portion. Upon the rearward side of the back portion 28 there is provided a series of serrations in the form of V-shaped parallel ribs 30 extending diagonally between the side edges, and which are matched with the diagonal grooves 24 of the body member so that the shelf member is interlockingly engageable with the body member. A diagonal slot opening 31 extending parallel to the diagonal ribs is provided centrally in the back portion and is outlined at the forward side by a flat bearing wall 32 for engagement by the nut of the clamping bolt which secures the shelf and body members in assembled relation, as will presently more fully appear.

As seen in Figs. 8 and 9, the shelf member is interlockingly engaged with the grooved lower portion of the body member and the parts are secured in interlocking relation by a bolt 33 having its head bearing upon the bearing wall portion 26 outlining the slot 25 of the body member and having its nut 34 bearing upon the bearing wall portion 32 outlining the diagonal slot opening 31 of the shelf member. Upon loosening the nut 34 the shelf member may be repositioned by vertical movement of the bolt 33 in the slot 25 to engage the ribs 30 with a selected area of the grooves 24 of the body member, to thus position the shelf member in a position roughly approximating its fitting relation with the cross-arm. Assuming that the width of each groove 24 is ¼ inch, it will be seen that by repositioning the shelf member upwardly or downwardly one groove, it will be vertically raised or lowered ¼ inch. In order to bring it into a position of exact adjustment to fit the cross-arm, the shelf member is diagonally moved by sliding its ribs 30 in the diagonal grooves 24, to thus obtain an upward or downward micromatic adjustment to any position between the approximate major adjustments. The length of the diagonal slot opening 31 is such as to permit limited transverse movement of the shelf member relatively to the bolt, sufficient to allow for necessary micromatic adjustment. Preferably the width of the shelf member is somewhat greater than the width of the body member, so that when the shelf member is diagonally shifted from a centralized position, as seen for instance in Fig. 8, both its side edges will still be outwardly of the edges of the body member.

The gain and the cross-arm 35 are mounted upon a round pole 36 by means of a through-bolt 37 extending through a diametrically drilled hole 38 in the pole, through the transverse slot 22 of the gain and through a centrally drilled hole 39 in the cross-arm, such center drilling being performed prior to placing the cross-arm in position upon the pole. A curved clamping washer 40 and a nut 41 are provided upon one threaded end of the through-bolt to engage the round surface of the pole, and a flat clamping washer 42 and nut 43 are engaged upon the other threaded end of the through-bolt to engage the forward flat surface of the cross-arm. Tightening of the clamping plate draws the cross-arm toward the pole to clamp the gain between them, the spurs 21 at the rearward side of the gain imbedding in the wood pole, as seen in Fig. 10, and the prongs 20 at the forward side imbedding in the cross-arm.

As the center drilled cross-arm is fixed against vertical movement with respect to the body member of the gain, and the latter is fixed against vertical movement relative to the through-bolt, such variations as exist in the vertical dimension between the through-bolt and the lower side of the cross-arm are compensated for by the adjustability of the shelf member. In operation, the shelf member is adjusted to an approximate fitting position with respect to the particular cross-arm, and thereupon hammer blows are imparted laterally at one side of the shelf member, causing it to move diagonally into exact fitting relation with the underside of the cross-arm, whereupon the bolt 33 and nut 34 are tightened to fix the adjusted position. The range of adjustment is such that the gain may be adjusted to support a minimum size cross-arm, as seen in Fig. 9, by bringing the bolt 33 to the upper end of the slot opening 25, or to support a maximum size cross-arm, as seen in Fig. 11, by bringing the bolt to the lower end of the slot opening.

The transverse slot opening 22 permits of transverse adjustment of the gain relatively to the through-bolt to adjust the gain to irregularities in the surface conformation of the pole, as seen for example in Fig. 12. The pole 36 as seen in Fig. 9 is perfectly round and the through-bolt is consequently centered in the slot opening 22. As seen in Fig. 12, the round surface of the pole at one side of the through-bolt has a greater radius than the round surface at the other side. Should the gain be centralized upon the through-bolt while at the same time the gain is in parallel relation to the cross-arm, the spurs 21 at one side will be in contact with the surface of the pole, and the spurs at the other side will be out of contact. By transversely shifting the gain prior to tightening the through-bolt, the spurs at both sides may be brought into engagement with the pole, while at the same time the gain remains in parallel relation to the cross-arm. Thus when the through-bolt is tightened the spurs at both sides will be substantially equally embedded into the pole, without bending of the through-bolt or twisting of the cross-arm from its normal position.

In Figs. 13 and 14 there is shown a modified form of the invention in which a body member 10a is adapted for engagement with a vertical planular surface 44 cut into the pole 36. To this end the pole-engaging rearward face 16a of the grid-like structure of the body member is disposed in a vertical plane as distinguished from the curved concave form of the rearward face 16 of the body member in the embodiment shown in Figs. 1–12. Also, the upper portion of the body member is provided with a circular through-bolt receiving hole 22a for receiving the through-bolt 37, as distinguished from the through-bolt receiving transversely extending slot opening 22 of the embodiment shown in Figs. 1–12.

In Figs. 15–19 there is shown a modified form of the invention, particularly adapted for the support of a cross-arm 45 of round cross-section, and which may vary in diameter between minimum and maximum limits, as for instance from approximately 6½ inches to approximately 12½ inches. The body member 10 in engagement with a round pole, is the same as that of the embodiment of Figs. 1–12, although it will be understood that a body member 10a identical to that of the embodiment of Figs. 13–14 may be employed in the case of a pole provided with a vertical planular surface. The vertically adjustable shelf member 46 comprises a downwardly and outwardly inclined shelf portion 47 connected at its upper edge by a downwardly and inwardly inclined wall portion 48 to the upper end of a vertical back portion 49, bracing strut portion 50—50 extending between the undersides of the portions 47 and 48 and the forward side of the portion 49. The back portion is substantially identical with the back portion 28 of the shelf member 11 of the embodiments shown in Figs. 1–14, being provided upon its rearward side with a series of V-shaped parallel ribs 51 extending diagonally between the side edges, and which are matched with the diagonal grooves 24 of the body member so that the shelf member is interlockingly engageable with the body member. A diagonal slot opening 52 extending parallel to the diagonal ribs is provided centrally in the back portion and is outlined at the forward side by a flat bearing wall 53 for engagement by the nut 34 of the clamping bolt 33 which secures the shelf and body members in assembled relation.

As shown in Fig. 18 a shelf member is in an outwardly adjusted position to support a round cross-arm 45 of substantially minimum diameter, and as shown in Fig. 19 the shelf member is in a downwardly adjusted position to support a round cross-arm 45 of substantially maximum diameter.

In the illustrated embodiment the upper surface of the inclined shelf portion 47 is at an angle of approximately 120° with the vertical forward face 12 of the body member 10. It has been found in practice that this angle allows a large range of cross-arm sizes for a given vertical adjustment of the shelf member, and automatically keeps the point of support approximately at the same proportional distance from the center of gravity of the cross-arm throughout the full range of diameters. It will be noted from a comparison of Figs. 18 and 19 that the relatively small diameter cross-arm of Fig. 18 will be supported upon the shelf member of the gain so that its point of engagement with the inclined surface of the shelf portion 47 is near the inner end of this surface, while the relatively large diameter cross-arm of Fig. 19 has its point of engagement near the outer end of the inclined surface. These points of engagement are substantially proportional for the complete range of sizes, being in substantially the same relation to the center of gravity of the cross-arm. The comparative relation is respectively shown in Figs. 18 and 19 by the triangles "S" and "L" connecting the center of gravity and the contact points of the cross-arm with the body and shelf members of the gain.

What is claimed is:

1. A gain for use between the side of a vertical pole and the inner and lower side of a through-bolt connected cross-arm, and wherein the through-bolt extends transversely through the pole and cross-arm, comprising a vertically disposed body member having a pole-engaging rearward face and a forward face and having a through-bolt receiving opening extending between said faces, said forward face including an upper face portion for engaging the inner side of said cross-arm and a lower face portion for extending below the lower side of said cross-arm, said lower face portion having a clamping bolt receiving vertical slot opening, a shelf member having a shelf portion for engaging the under side of said cross-arm and a vertical back portion engaged with said lower face portion and having a clamping bolt receiving slot opening disposed transversely across said vertical slot opening, and of substantially greater length than the width of said vertical slot opening; a clamping bolt engaged in said slot openings of said body and shelf members to draw said shelf member into clamping engagement with said body member upon tightening of said bolt and to allow separation of said members upon loosening of said bolt, and interlocking formation on said lower face portion of said body member and said back portion of said shelf member comprising a series of complementary and inter-engaging parallel straight line serrations upon said respective face and body portions extending diagonally with respect to said vertical slot openings, said serrations of said shelf member being relatively slideable upon loosening of said clamping bolt in an upward or downward diagonal direction longitudinally of said serrations of said body member to raise or lower said shelf member through micromatic increments with respect to said body member.

2. A gain as defined in claim 1, wherein said slot opening of said shelf member is diagonally disposed in parallel relation to said diagonally extending serrations of said shelf member.

3. A gain as defined in claim 1, wherein said shelf portion of said shelf member has a horizontal upper surface for engaging the lower side of a rectangular cross-section cross-arm.

4. A gain as defined in claim 1, wherein said shelf portion of said shelf member has a downwardly and outwardly inclined upper surface for engaging the lower side of a round cross-arm.

5. A gain as defined in claim 1, wherein said serrations are each of equal height vertically, and said shelf member is adapted to be vertically repositioned to engage different serrations with said serrations of said body member to effect vertical adjustment in increments corresponding to the vertical height dimension of said serrations.

References Cited in the file of this patent

UNITED STATES PATENTS

| 1,043,260 | Shover | Nov. 5, 1912 |
| 1,173,418 | Ette | Feb. 29, 1916 |
| 1,802,995 | Williams | Apr. 28, 1931 |
| 2,704,586 | Kennedy | Mar. 22, 1955 |

FOREIGN PATENTS

| 10,134 | Great Britain | 1901 |
| 287,664 | Great Britain | Mar. 29, 1928 |